United States Patent [19]

Malsot et al.

[11] 4,330,171
[45] May 18, 1982

[54] OPTICAL-FIBER CONNECTOR, CENTERING DEVICE AND METHOD OF MANUFACTURE OF SAID CONNECTOR

[75] Inventors: Christian Malsot; Jean-Marie Badoz, both of Suresnes, France

[73] Assignee: Socapex, Suresnes, France

[21] Appl. No.: 73,322

[22] Filed: Sep. 7, 1979

[30] Foreign Application Priority Data

Sep. 12, 1978 [FR] France .................... 78 26108

[51] Int. Cl.³ ..................................... G02B 5/14
[52] U.S. Cl. ........................ 350/96.21; 350/96.20
[58] Field of Search ............ 350/96.20, 96.21; 264/1.5

[56] References Cited

U.S. PATENT DOCUMENTS

| 4,099,832 | 7/1978 | Warner | 350/96.21 |
| 4,109,994 | 8/1978 | Chown | 350/96.21 |
| 4,186,999 | 2/1980 | Harwood et al. | 350/96.20 X |

*Primary Examiner*—John K. Corbin
*Assistant Examiner*—Rodney B. Bovernic
*Attorney, Agent, or Firm*—Cushman, Darby & Cushman

[57] ABSTRACT

In order to connect fibers so as to ensure high efficiency of light transmission through connectors, fiber ends must be centered in terminals with a high degree of accuracy. In the proposed connector, each fiber terminal serves as a mold for the injection of a polymer or a fiber-retaining adhesive. A simple geometrical device is employed for centering the fiber end within its terminal, accuracy of centering being ensured solely by the device itself without being dependent on precision-machining of the terminal.

The invention is applicable to either single or multiple connectors employed in optical-fiber data-transmission systems.

7 Claims, 7 Drawing Figures

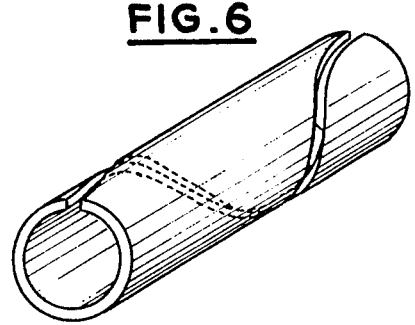
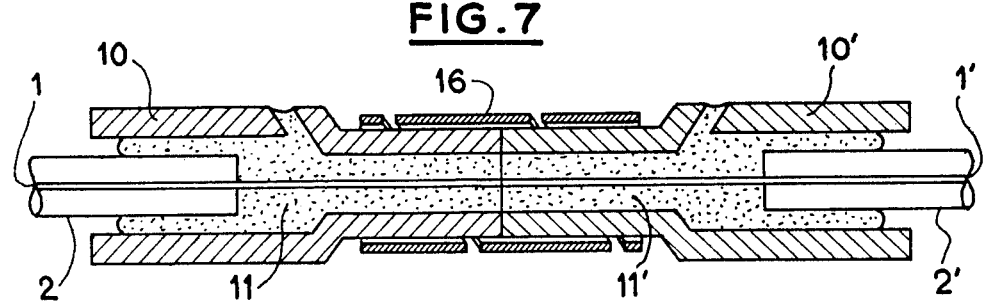

OPTICAL-FIBER CONNECTOR, CENTERING DEVICE AND METHOD OF MANUFACTURE OF SAID CONNECTOR

This invention relates in general to connectors for optical fiber transmission lines in which the two ends of optical fibers to be connected must be perfectly aligned with respect to each other. Specifically, the invention provides a terminal which serves to attach a fiber within a connector body and to a device for centering the fiber within the terminal.

The optical fibers employed for very-high-speed data transmission have an active core 40 to 60 microns in diameter and protected by an outer jacket of glass or silica having a diameter of the order of 120 microns. In order to make an end-to-end connection between two fibers, a very high degree of precision is required in the transverse position of the two fiber ends within their respective terminals. Thus it has been demonstrated by practical experience that a maximum precision tolerance of 1 micron is necessary.

It is further apparent that the fibers must be butt-aligned or, in other words, must come into end-to-end contact in order to prevent loss of light. This result is obtained by polishing the entire end portion of the connector and is completed by a film of transmission liquid which will be included between the two flat faces of the connectors. In order to ensure perfect achievement of this polishing operation, however, the metal of the connector, the glass of the optical fiber and the material of the terminal must have substantially the same degree of hardness. It is for this reason that the polymer or adhesive employed for fabricating the terminal is filled with quartz powder or glass fiber powder.

The methods of manufacture of optical-fiber terminals which are at present known make use of molding by injection or by transfer within highly accurate molds since the optical fiber must be centered to within 1 micron. However, the nature of the injected product filled with abrasive powder is such that the mold is subject to very rapid wear and must be changed at frequent intervals (after fifteen to twenty molding operations), thus making this operation prohibitive both from an economic and from an industrial standpoint.

In the connector according to the invention, a carefully machined and precision-molded terminal is replaced by a metallic terminal of lower precision in which the optical fiber is placed with a high degree of accuracy by simple and economical means in a position in which said fiber is fixed by a polymer or a filled adhesive. Thus the metallic terminal performs the function of a mold and is no longer subject to wear since it is used only once.

In more exact terms, the invention relates to an optical-fiber connector comprising an attachment terminal in which the end portion of the optical fiber from which the protective jacket of the optical fiber has been stripped from said end portion is engaged and held in position by means of a hardenable material such as polymer or adhesive filled with hard particles such as quartz powder or glass powder. Said connector is distinguished on the one hand by the fact that the terminal performs the function of injection mold for the hardenable material and on the other hand by the fact that the optical fiber is positioned within the terminal with a degree of accuracy which is independent of the accuracy of external and internal machining of the terminal and which is higher than the accuracy of the internal machining.

A more complete understanding of the invention will be gained from the following explanations given with reference to the accompanying drawings, wherein:

FIG. 6 illustrates a coupling sleeve;

FIG. 7 illustrates the coupling of connectors designed in accordance with the invention.

Figure 1:
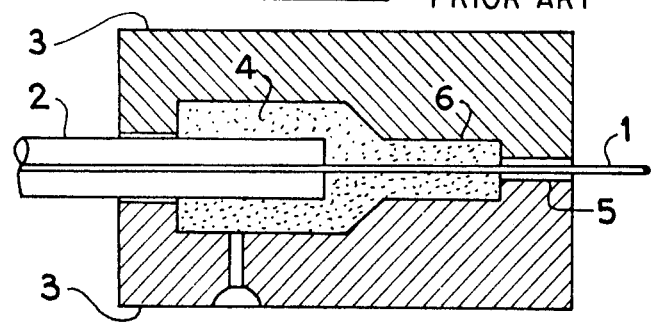
FIG. 1 illustrates one type of plastic terminal in accordance with the prior art.

FIG. 1 shows a plastic terminal in accordance with the prior art. An optical fiber 1 protected by a plastic sheath or jacket 2 is in position within a mold 3 at the end of the operation which consists in molding of the terminal 4. Although the mold is highly simplified in this diagram, it is apparent that the optical fiber is perfectly centered only by virtue of the precision of the centering passage 5 and of the cylindrical barrel 6 of the mold. However, by reason of the erosion produced by the hard particles with which the molding resin of the terminal 4 is filled, accuracy of centering of the optical fiber is obtained only by frequent replacement of the mold 3, thus entailing high capital cost since a mold of this type is machined with high precision.

Figure 2:
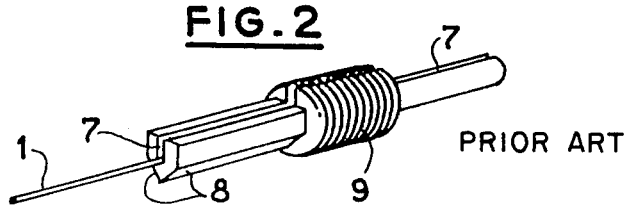
FIG. 2 illustrates another type of metallic terminal in accordance with the prior art.

FIG. 2 shows a metallic terminal in accordance with the prior art. This type of terminal can be employed alone for a fiber-to-fiber connection (in which case it is provided with a threaded portion 9 for attachment to another terminal) or for the group connection of a bundle of fibers by means of one terminal for each fiber within a multiple connector. In both cases, the terminal is constituted by a precision-machined metallic component in which is formed a longitudinal groove 7 for receiving the optical fiber 1. The groove 7 is then sealed with adhesive. Two longitudinal chamfers 8 are employed as reference planes during the assembly operation, first for machining the groove 7 and then for positioning the fiber. The small dimensions of the part and the high accuracy of machining result in a high cost of manufacture of a part of this type. Furthermore, and in spite of its small dimensions, said part still has a substantial bulk in comparison with an optical fiber.

This is not the case with the terminal according to the invention since this latter is of small size as well as simple and inexpensive to produce.

Figure 3:
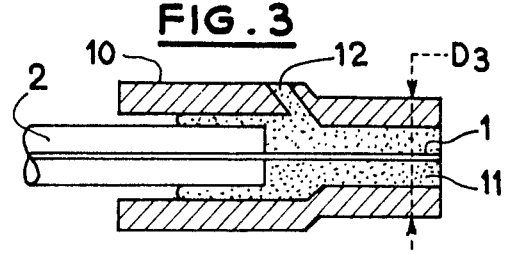
FIG. 3 illustrates a connector in accordance with the invention.

FIG. 3 shows a connector according to the invention. The optical fiber 1 and its jacket 2 are maintained centered with respect to the metallic terminal 10 by injecting hardenable material 11 consisting of polymer or adhesive, said injection being performed by means of the orifice 12 located on a generating-line. The original feature of this terminal lies in the fact that the outer metallic portion of the terminal 10 constitutes the injection mold. Since this metallic portion is used only once, it is not eroded by the filled mass of quartz powder or glass powder, with the result that costly replacement of the terminal is wholly unnecessary. Moreover, since the optical fiber is centered by means of a simple method which will be described hereinafter, it is only necessary to ensure that the outer metallic portion of the terminal 10 is wholly uniform.

According to the invention, accuracy of centering of an optical fiber is no longer obtained by precision-machining of each terminal but by virtue of the accuracy of the device employed for the assembly operation, this result being less costly from an industrial standpoint and much easier to carry into practical effect.

The terminal according to the invention is illustrated in FIG. 3 without any implied limitation and presented as a cylinder having a large diameter at one end and a small diameter at the other end. The annular shoulder thus formed by the difference in diameters usually has a function of longitudinal locking of the fiber within a connector of complex design. If this is permitted by the system of connection or if an increase in diameter of the terminal does not constitute a disadvantage, the metallic portion of the terminal 10 can be a true cylinder, the single internal diameter of which corresponds to that of the jacket 2. This introduces a further simplification in the manufacture and reduces the cost of the connector.

In order to explain the method of centering of the glass fiber within the terminal, it is first necessary to give a brief outline of the geometrical principles on which it is based.

Figure 4:
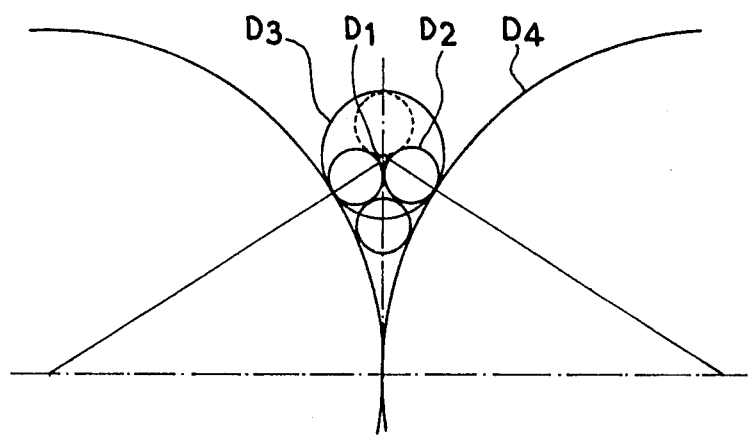
FIG. 4 is a geometrical diagram of centering of the optical fiber within the terminal.

FIG. 4 explains the high-precision geometrical centering of an optical fiber within its metallic terminal. Let:

$D1$ be the external diameter of the optical fiber, $D2$ be the diameter of the three circles which are tangent to each other and to the optical fiber, $D3$ be the useful external diameter of the terminal (see FIG. 3), $D4$ be the diameter of the circles which are tangent to each other and to the terminal.

The value of D1 is determined by the dimension of the external diameter of the optical fiber and is therefore known with a very high degree of accuracy.

Said diameter D1 determines the diameters D2 of the circles which are tangent to each other and to the optical fiber.

By calculation, we get $$D2 = 6.463\ D1 \qquad (a)$$

and $$D3 = 2(D1/2 + D2)$$

Thus in the case of the circles having diameters D4 which are tangent to each other and to D3, we get $$D4 = 6.463\ D3$$

by the same relation as (a).

Hence, by way of non-limitative example, where $D1 = 125$ microns (this value being commonly employed in the case of an optical fiber):

$D2 = 0.808$ mm
$D3 = 1.741$ mm
$D4 = 11.252$ mm

In this assembly, the centers of the circles having diameters D1 and D3 are in fact strictly coincident, with the result that the axis of the optical fiber and the axis of the terminal also coincide.

Accordingly, a fiber can be perfectly centered within a terminal by means of this configuration.

In a practical application, a simple arrangement consisting of calibrated rods serves to construct the assembly described in FIG. 4.

It is an easy matter to obtain cylinders having an external diameter which conforms to a very precise dimensional tolerance of the order of one micron. In metrology, these calibrated cylinders or rods are even available with a guaranteed accuracy corresponding to a tolerance on the diameter of one tenth of a micron.

Figure 5:
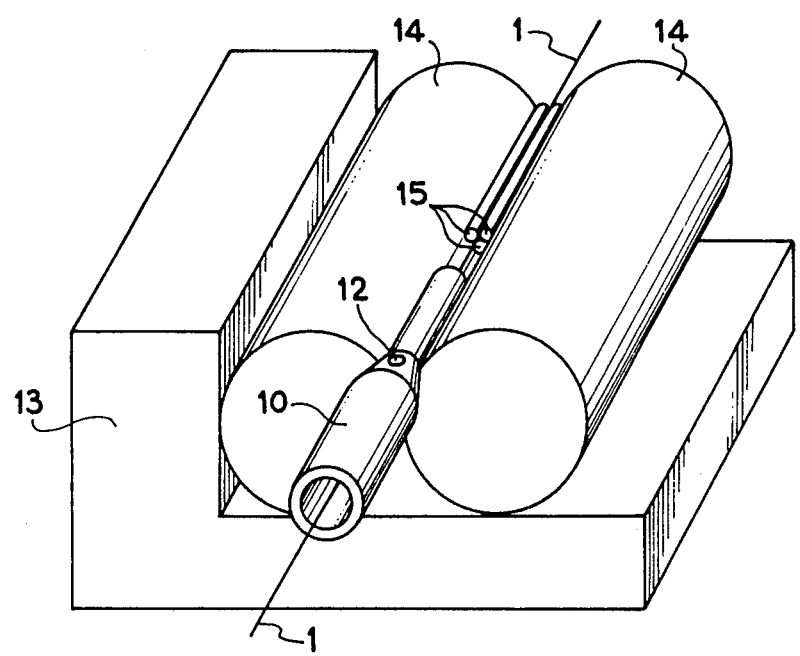
FIG. 5 is a diagram of mechanical assembly of the connectors.

FIG. 5 shows the diagram of assembly of a terminal on an optical fiber by means of calibrated rods.

A part 13 is formed by two perfect planes located at right angles to each other.

Two large and identical calibrated rods 14 are inserted within said right-angled portion and maintained in this position by suitable means which are tangent to each other.

Between these two calibrated rods 14, three small and identical calibrated rods 15 are positioned in such a manner as to ensure that one of these latter is tangent to the rods 14, the other calibrated rods being each tangent to the other two rods and to a rod 14.

The optical fiber 1 rests on the calibrated rods 15. Different mechanical pressure means are provided for maintaining the calibrated rods 14 within the right-angled portion, for maintaining the calibrated rods 15 within the curvilinear angle formed by the calibrated rods 14, and for maintaining the fiber within the curvilinear angle formed by the calibrated rods 15.

A metallic terminal 10 is then positioned and retained in such a manner as to ensure that its diameter D3 rests between the calibrated rods 14.

The fiber is then located in strictly coaxial relation with the terminal.

It then remains necessary only to maintain this configuration, this being effected, for example, by injecting a resin or like polymerizable product into the hollow portion of the terminal through the orifice 12. The configuration shown diagrammatically in FIG. 3 is then obtained.

After sawing or breaking the fiber by conventional means followed by polishing, there is therefore obtained a connector in which the optical fiber is perfectly centered with a degree of accuracy which exceeds one micron.

The alignment of two optical fibers within their terminals in order to constitute an optical connection is carried out by means of a cylindrical sleeve in which a helical slit is formed from one end of the sleeve to the other.

FIG. 6 illustrates a coupling sleeve of this type. Its special shape permits uniform deformation of the coupling sleeve while remaining concentric with itself and therefore while maintaining the two optical fibers in aligned relation. In fact, in the event of a very slight difference in diameter of the two connectors to be aligned, the reconstitution means provided by a coupling element must be capable of absorbing such a difference. It should further be noted that any detachable engagement of a cylinder within a bore must make provision for a not-negligible degree of working play.

In consequence, the design contemplated in FIG. 6 permits resilient adjustment of two connectors to be coupled together, this result being achieved without any working play and under the action of elasticity. This method of construction accordingly makes it possible to ensure optical continuity of a line fitted with a separable connector, with low losses at each connection point.

Moreover, each connector assembly is highly reliable since the adhesive which is filled with quartz or silica particles and is thus very abrasive is never in contact with the connector assembly itself.

FIG. 7 shows the connection system obtained for joining one optical fiber 1 to another optical fiber 1' by means of two identical terminals 10 and 10' and by means of a coupling sleeve 16.

An alternative embodiment of the connector according to the invention consists in the use of terminals and of a coupling sleeve having a polygonal section which is symmetrical with respect to an axis and such that the circle having a diameter D3 of FIG. 4 is tangent to all the faces of the polygon. However, the difficulty involved in the manufacture of terminals and sleeves of this type makes it preferable to adopt a cylindrical shape.

Irrespective of the shape adopted for a preferred embodiment of the connector according to the invention, it still holds true that the diameter of this connector is much smaller (less than 2 mm) than the diameter of metallic connectors of existing types. A high connection density and a simple constructional design are thus made possible by a centering device and a method of manufacture which are both straightforward and low in capital cost.

The connector according to the invention which has been described in the case of connection of two optical fibers can be applied together with the method of manufacture of the connector to the case in which a plurality of optical fibers are connected in pairs within a multiple-connector box.

What is claimed is:

1. A connector for an optical fiber having an active core for conducting a light signal and a protective jacket surrounding said active core, comprising:
    an attachment terminal having a bore therethrough for receiving an end portion of said optical fiber from which a portion of said protective jacket has been stripped, the active core being positioned by a device external to said terminal,
    the bore being larger than the outer diameter of said protective jacket,
    means for introducing a hardenable material, such as a polymer or adhesive filled with hard particles such as quartz powder or glass powder into the space within said bore not occupied by said optical fiber, the terminal being adapted to function as an injection mold for the hardenable material, the optical fiber being positioned within said terminal by said external device with a degree of accuracy independent of the accuracy of the external machining of the terminal or the internal machining of the bore therein and which accuracy is greater than said internal machining accuracy.

2. An optical-fiber connector as defined in claim 1 wherein said means for introducing comprises an orifice provided along a generating-line of the terminal for the injection of hardenable material.

3. An optical-fiber connector as defined in claim 1, wherein the terminal has a hollow cylindrical shape.

4. An optical-fiber connector as defined in claim 1, wherein the terminal is constituted by a tube having a polygonal section.

5. A device for centering an optical fiber having a diameter D1 within a bore of a terminal having an external diameter D3 in order to produce a connector as defined in claim 1, comprising:
    optical-fiber centering means constituted by three small identical cylinders having a diameter D2 and being positioned tangent to each other along a generating-line, the optical fiber being in turn maintained tangent to two small cylinders within the curvilinear angle made between said cylinders, the diameters D1 of the fiber and D2 of the cylinders being determined with respect to each other by the relation D2=6.463 D1,
    terminal centering means constituted by two large identical cylinders having a diameter D4 and being positioned tangent to each other along a generating-line, the terminal being maintained tangent to said cylinders within the curvilinear angle made between said cylinders, the diameters D3 of the terminal and D4 of the cylinders being determined with respect to each other by the relation D4=6.463 D3,
    the fiber centering means and the terminal centering means being rigidly fixed to each other, the axis of the cylinders being parallel to the axis of the optical fiber and so arranged that one of the small cylinders having a diameter D2 is tangent to the other two small cylinders as well as to the two large cylinders having a diameter D4 in the projection of said small cylinders on a plane at right angles to the fiber whilst each of the other two small cylinders is tangent only to one large cylinder, the diameters D1, D2 and D3 being also determined with respect to each other by the relation D3=2 (D1/2+D2) which ensures that the optical fiber and the terminal are concentric with a precision equal to that obtained on the diameters of the cylinders.

6. An optical-fiber connector for connecting two optical lines, wherein mechanical attachment and optical alignment of two identical connector terminals according to claim 1 is carried out by engagement within a metallic tube in which a helical slit is formed from one end of said tube to the other.

7. A connector assembly for an optical fiber having an active core for conducting a light signal and a protective jacket surrounding said active core formed by the following process:
    providing optical-fiber centering means constituted by three small identical cylinders having a diameter D2 and being positioned tangent to each other along a generating-line, the optical fiber being in turn maintained tangent to two small cylinders within the curvilinear angle made between said cylinders, the diameters D1 of the fiber and D2 of the cylinders being determined with respect to each other by the relation D2=6.463 D1,
    providing terminal centering means constituted by two large identical cylinders having a diameter D4 and being positioned tangent to each other along a generating line, the terminal being maintained tangent to said cylinders within the curvilinear angle made between said cylinders, the diameters D3 of the terminal and D4 of the cylinders being determined with respect to each other by the relation D4=6.463 D3,
    the fiber centering means and the terminal centering means being rigidly fixed to each other, the axes of the cylinders being parallel to the axis of the optical fiber and so arranged that one of the small cylinders having a diameter D2 is tangent to the other two small cylinders as well as to the two large cylinders having a diameter D4 in the projection of said small cylinders on a plane at right angles to the fiber whist each of the other two small cylinders is tangent only to one large cylinder, the diameters D1, D2 and D3 being also determined with respect to each other by the relation D3=2 (D1/2+D2) which ensures that the optical fiber and the terminal are concentric with a precision equal to that obtained on the diameters of the cylinders, providing an attachment terminal having a bore therethrough for receiving an end portion of said optical fiber, said terminal having a bore that is larger than the outer diameter of said protective jacket, stripping an end portion of an optical fiber;

passing the strip end portion through said terminal and applying it against said fiber centering cylinders;

applying the terminal against said terminal centering cylinders;

injecting a hardenable material such as a polymer or adhesive filled with hard particles such as quartz powder or glass powder into the bore portion of said terminal so as to fix the fiber in a position in which said fiber is perfectly concentric with said terminal;

allowing said hardenable material to solidify;

withdrawing the connector assembly from the centering device and severing the optical fiber at the end of the terminal to provide a point for connection with another fiber; and polishing the severed end of the optical fiber.

* * * * *